Figure 1:
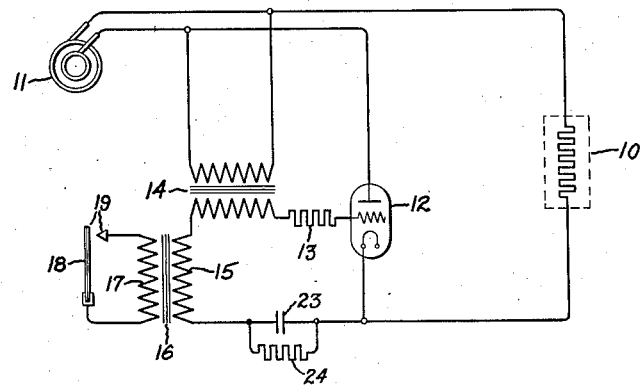

Oct. 13, 1936.　　H. L. PALMER　　2,057,585
ELECTRIC TRANSLATING CIRCUIT
Filed July 13, 1932

Inventor:
Harry L. Palmer,
by Charles E. Mullen
His Attorney.

UNITED STATES PATENT OFFICE 2,057,585

ELECTRIC TRANSLATING CIRCUIT

Harry L. Palmer, Scotia, N. Y., assignor to General Electric Company, a corporation of New York Application July 13, 1932, Serial No. 622,259

6 Claims. (Cl. 250—27)

My invention relates to electric translating circuits and more particularly to such circuits utilizing an electric valve for controlling the energization of a load device or circuit.

Heretofore there have been proposed various arrangements including electric valves for controlling the energization of a load circuit. When such a load circuit requires a considerable amount of energy, the use of valves of the vapor electric discharge type has been found particularly advantageous because of the relatively large amounts of energy which may be handled at ordinary operating voltages. In such arrangements, it is generally customary to control the energization of the load device or circuit by the control of the grid potential of the vapor electric valve or valves. Valves of the vapor electric discharge type, however, require an appreciable amount of grid energy and in some cases an excess of energy is supplied the grid circuit to insure accurate control. It sometimes occurs that it is desired to control such a valve in response to a delicate relay or circuit controlling means which is incapable of handling the energy supplied to the grid circuit of such an electric valve. My invention relates to a circuit arrangement of this type.

It is an object of my invention, therefore, to provide an improved electric translating circuit including a vapor electric valve which will overcome the above mentioned disadvantages of the arrangements of the prior art and which will be simple and reliable in operation.

It is another object of my invention to provide an improved electric translating circuit including a vapor electric valve in which the energization of a load device or circuit is controlled by the electric valve in response to the operation of a circuit controlling means incapable of satisfactorily handling the normal energy of the circuit of the valve.

In accordance with one embodiment of my invention, a load device, or circuit, is interconnected with a source of periodic or alternating current by means of a grid controlled vapor electric valve. The control circuit for the valve grid includes a source of periodic or alternating potential synchronous with that of the current source, and a reactance device which is effective to modify the controlling action of the grid potential. The circuit controlling means, in response to which it is desired to control the energization of the load circuit, is connected to short circuit the reactance device. With such an arrangement the circuit controlling means is not required to interrupt the current in the grid circuit.

For a better understanding of my invention, together with other and further objects thereof, reference is had to the following description taken in connection with the accompanying drawing and its scope will be pointed out in the appended claims. In the drawing, Fig. 1 illustrates an embodiment of my invention in which the control of a vapor electric valve is modified by an inductive reactance in its grid circuit, while Fig. 2 illustrates another embodiment of my invention utilizing a capacitive reactance for the same purpose.

Referring now to Fig. 1 of the drawing, there is illustrated an arrangement for energizing a load device or circuit 10 from a source of periodic or alternating current 11, through an electric valve 12. The valve 12 is provided with an anode, a cathode, and a control grid and is of the vapor electric discharge type in which the starting of current in the valve may be controlled by the potential on its grid but in which the current in the device can be interrupted only by reducing the anode potential below its critical value. By the term "grid" is meant a perforated conductive element interposed between the cathode and anode or any control electrode of the several types well known in the art effective to control the starting of current in an electric valve. There is provided a control circuit for the grid of the valve 12 including a current limiting resistor 13 and the secondary winding of a transformer 14, the primary winding of which is energized from the source 11 and so connected as to supply to the grid an alternating potential substantially in phase opposition to that impressed upon the anode of the valve 12. The grid circuit also includes the primary winding 15 of an inductive reactance device 16 provided with a secondary winding 17. The circuit relationship of the reactance device 16 may be determined by any suitable circuit controlling means in response to which it is desired to control the energization of the load device 10. For example, the device 16, which is normally serially connected in the grid circuit, may be shunted by short circuiting the winding 17 by means of a bi-metallic thermostat 18 provided with contacts 19. In case the load device 10 is inductive, it is also preferable to include in the grid circuit a source of negative bias potential, such, for example, as a negative bias capacitor 23 and high resistance leak 24.

In explaining the operation of the above described apparatus, it will be assumed that the contacts 19 are in the open position, as illustrated. Under this condition, the alternating potential supplied by the transformer 14 to the grid of the valve 12, being in phase opposition to the anode potential of the valve 12, tends to maintain the valve 12 nonconductive to deenergize the load device 10. However, during the half cycles of alternating current when the anode of the valve 12 is negative, the grid is positive and a small positive grid current will flow during these half cycles, the grid acting as an auxiliary anode. The device 16 has a considerable inductive reactance which tends to maintain this grid current after the grid potential has reversed polarity; that is, after the anode potential again becomes positive, with the result that the grid is positive for the initial portion of each half cycle of positive anode potential and the valve 12 is rendered conductive to energize the load device 10. When the circuit controlling means 18 operates, in response to any predetermined condition, to close its contacts 19, the winding 17 is short circuited, thus practically shunting the reactance device 16 from the grid circuit. The reduced reactance of the grid circuit is now insufficient to maintain the positive grid current any appreciable time after the grid potential falls to zero with the result that the grid is made negative and the anode of the valve 12 positive simultaneously and the valve 12 is maintained nonconductive to deenergize the load device 10. However, when the load device 10 is inductive, the anode current is maintained for a portion of each cycle after the supply voltage reverses and it is necessary to maintain the grid negative during these intervals. This may be obtained by a negative bias, such, for example, as that produced by the capacitor 23 and leak 24. Thus, with the arrangement of Fig. 1, the contacts 19 of the circuit controlling means 18 are required to handle only a minimum amount of grid energy.

Figure 2:
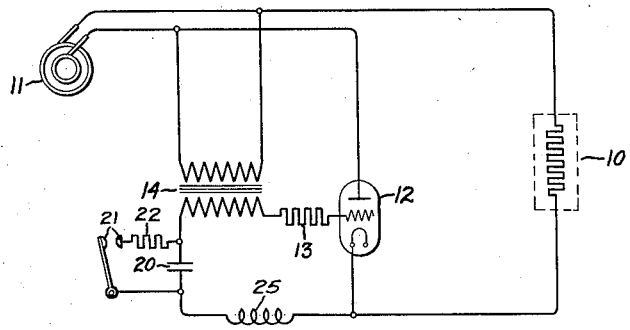

In the arrangement of Fig. 2, the reactance device 16 of Fig. 1 is replaced by a single winding reactor 25 and the control is effected by a capacitive reactance device 20 connected in series therewith and arranged to be short circuited by a pair of contacts 21. A resistor 22 is preferably included in series with the contacts 21 to minimize sparking. When the contacts 21 are closed to short circuit the reactance device 20, the reactor maintains the valve 12 conductive as in the case when the contacts 19 in the arrangement of Fig. 1 are open. When the contacts 21 open, however, the capacitive reactance device 20 neutralizes the inductive reactance of reactor 25 and the valve is maintained nonconductive, as explained in connection with Fig. 1.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An electric translating circuit comprising a source of periodic current, a load circuit, a vapor electric valve interconnecting said source and said load circuit and provided with a control grid, a control circuit for said grid, means for applying to said grid control circuit a periodic potential of a predetermined fixed phase relation with respect to that of said source to normally maintain said valve nonconductive, a reactance device cooperating with said grid circuit to modify the effect of the potential applied to said grid in a sense opposite to the effect produced by the remainder of said circuit, and circuit controlling means for rendering ineffective the action of said reactance device upon said grid circuit.

2. An electric translating circuit comprising a source of periodic current, a load circuit, a vapor electric valve interconnecting said source and said load circuit and provided with a control grid, a control circuit for said grid including means for applying to said grid a periodic potential of a predetermined fixed phase relation with respect to that of said source to control the conductivity of said valve, a reactance device connected in said grid circuit to give said grid potential an opposite controlling effect, and circuit controlling means for short circuiting said reactance device.

3. An electric translating circuit comprising a source of alternating current, a load circuit, a vapor electric valve interconnecting said source and said load circuit and provided with a control grid, a control circuit for said grid, means for applying to said grid control circuit an alternating potential of such a fixed phase relation with respect to that of said source as to normally render said valve nonconductive, an inductance device cooperating with said grid circuit to modify the effect of said grid potential to render said valve conductive, and circuit controlling means for determining the circuit relationship of said inductance device and said grid circuit.

4. An electric translating circuit comprising a source of alternating current, a load circuit, a vapor electric valve interconnecting said source and said load circuit and provided with a control grid, a control circuit for said grid including means for applying to said grid an alternating potential substantially in phase opposition to that of said source, an inductance device connected in said grid circuit to modify the effect of said grid potential, and circuit controlling means for short circuiting said inductance device.

5. An electric translating circuit comprising a source of alternating current, a load circuit, a vapor electric valve interconnecting said source and said load circuit and provided with a control grid, a control circuit for said grid including means for applying to said grid an alternating potential substantially in phase opposition to that of said source, an inductance device cooperating with said grid circuit to modify the effect of said grid potential to tend to render said valve conductive, a capacitance device for modifying the effect of said inductance device, and circuit controlling means for determining the circuit relationship of said capacitance device and said grid circuit.

6. An electric translating circuit comprising a source of alternating current, a load circuit, a vapor electric valve interconnecting said source and said load circuit and provided with a control grid, a control circuit for said grid including means for applying to said grid an alternating potential substantially in phase opposition to that of said source, an inductance device in said grid circuit, a capacitance device normally in series relation with said inductance device and having a capacitive reactance substantially equal to the inductive reactance of said grid circuit, and circuit controlling means connected to said capacitance device for selectively changing the impedance of said grid circuit from substantially zero to a substantially inductive reactance.

HARRY L. PALMER.